US010094185B2

(12) United States Patent
Dillard et al.

(10) Patent No.: US 10,094,185 B2
(45) Date of Patent: Oct. 9, 2018

(54) CORIOLIS FLOW METER HAVING FLOW TUBE WITH EQUALIZED PRESSURE DIFFERENTIAL (71) Applicant: Weatherford Technology Holdings, LLC, Houston, TX (US)

(72) Inventors: Walter S. Dillard, Houston, TX (US); Paul R. Northam, Houston, TX (US); Gerald G. George, Magnolia, TX (US); Lev Ring, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 341 days.

(21) Appl. No.: 14/859,531

(22) Filed: Sep. 21, 2015

(65) Prior Publication Data

US 2016/0084024 A1 Mar. 24, 2016

Related U.S. Application Data (60) Provisional application No. 62/053,015, filed on Sep. 19, 2014.

(51) Int. Cl.
*E21B 21/08* (2006.01)
*G01F 1/84* (2006.01)
(Continued)

(52) U.S. Cl.
CPC ............ *E21B 21/08* (2013.01); *G01F 1/8409* (2013.01); *G01F 1/8477* (2013.01);
(Continued)

(58) Field of Classification Search
CPC .... G01F 1/8409; G01F 1/8477; G01F 15/024; G01F 15/10; G01F 15/14; E21B 21/08
See application file for complete search history.

(56) References Cited

U.S. PATENT DOCUMENTS 3,329,019 A * 7/1967 Sipin ..................... G01F 1/8409
73/861.357
3,355,944 A * 12/1967 Sipin ..................... G01F 1/8409
73/861.355
(Continued)

FOREIGN PATENT DOCUMENTS

EP 1 744 142 A1 1/2007
FR 2 911 680 1/2007

OTHER PUBLICATIONS

Weatherford, "Microflux Control System, " Product Brochure, copyright 2010.
(Continued)

*Primary Examiner* — Matthew R Buck
(74) *Attorney, Agent, or Firm* — Blank Rome, LLP (57) ABSTRACT A Coriolis flow meter for a drilling system measures flow from a wellbore and/or from at least one pump into the wellbore. The meter can be disposed upstream of at least one choke used for controlling backpressure, and/or the meter can be disposed between at least one pump and the wellbore. The meter has at least one flow tube adapted to vibrate and conducts the flow at a first pressure level from an inlet side to an outlet side. A vessel encloses the at least one flow tube at least between the inlet and outlet sides and holds a second pressure level therein about the at least one flow tube. The second pressure level can be equal to or nearly equal to the first pressure level to reduce or nearly eliminate a pressure differential across the at least one flow tube. For example, the second pressure level can be elevated above environmental relative to the first pressure level to reduce a pressure differential across the at least one flow tube. Alternatively, the second pressure level can be less than the first pressure level.

32 Claims, 8 Drawing Sheets (51) Int. Cl.
*G01F 15/14* (2006.01)
*G01F 15/02* (2006.01)
*G01F 15/10* (2006.01)

(52) U.S. Cl.
CPC ............ *G01F 15/024* (2013.01); *G01F 15/10* (2013.01); *G01F 15/14* (2013.01)

(56) References Cited

U.S. PATENT DOCUMENTS

| | | | | |
|---|---|---|---|---|
| 3,983,744 | A * | 10/1976 | Agar | G01N 9/002 73/32 A |
| 4,703,664 | A | 11/1987 | Kirkpatrick | |
| 5,301,557 | A | 4/1994 | Cage et al. | |
| 5,321,991 | A | 6/1994 | Kalotay | |
| 5,347,874 | A * | 9/1994 | Kalotay | G01F 1/8422 73/202 |
| 5,373,745 | A | 12/1994 | Cage | |
| 5,661,232 | A * | 8/1997 | Van Cleve | G01F 1/8459 73/32 R |
| 5,892,159 | A | 4/1999 | Smith | |
| 6,513,393 | B1 | 2/2003 | Eckert | |
| 7,044,237 | B2 * | 5/2006 | Leuchtenberg | E21B 21/08 166/53 |
| 9,388,650 | B2 * | 7/2016 | Leuchtenberg | E21B 21/08 |
| 9,435,162 | B2 * | 9/2016 | Duhe | E21B 21/08 |
| 2011/0029259 | A1 * | 2/2011 | Cunningham | G01F 1/8477 702/47 |
| 2013/0192841 | A1 * | 8/2013 | Feasey | E21B 21/08 166/336 |

OTHER PUBLICATIONS

Weatherford, "Early Kick/Loss Detection Services," Product Brochure, copyright 2011-2012.

Emerson Process Management, "Micro Motion ELITE Coriolis Flow and Density Sensors," Installation Manual, copyright 2014.

Crenshaw, J. et al., "MPD Technique in Haynesville Shale Delivers Significant Value in Over Pressured Zones, A Case Study on Four Wells, " copyright 2011.

Emerson Process Management, "Upstream Production Measurement Solutions," copyright 2013.

Emerson Process Management, "High Capacity Coriolis," copyright 2013.

Mostafa, Rohani R., "Managed-Pressure Drilling; Techniques and Options for Improving Operational Safety and Efficiency", copyright 2011.

Weatherford, "Microflux Control System Opens a Conventionally Inaccessible Offfshore Drilling Operation in Egypt, Enchances Safety", copyright 2012.

Emerson Process Management, "High Temperature Coriolis", copyright 2013.

Emerson Process Management, "High Performance Coriolis Measurement Systems," copyright 2013.

Smart, Denver et al., Micro Motion, Inc., "Understanding and Selecting Coriolis Technology for Drilling Fluid Monitoring," copyright 2013.

Emerson Process Management, "Smart Meter Verification", copyright 2013.

Kuhny, Dave, Micro Motion, Inc. "Compensating for the effects of high pressure on the measurement accuracy of Coriolis flowmeters," copyright 2011.

PCT International Search Report dated Dec. 21, 2015 for PCT Application No. PCT/US2015/051200 filed Sep. 21, 2015.

Office Action in counterpart CA Appl. 2961388, dated Jan. 19, 2017, 4-pgs.

Examination Report No. 1 in counterpart AU Appl. 2015317297, dated Oct. 30, 2017, 3-pgs.

Examination Report No. 2 in counterpart AU Appl. 2015317297, dated Dec. 7, 2017, 2-pgs.

* cited by examiner

CORIOLIS FLOW METER HAVING FLOW TUBE WITH EQUALIZED PRESSURE DIFFERENTIAL

CROSS-REFERENCE TO RELATED APPLICATIONS

This application claims the benefit of U.S. Provisional Appl. 62/053,015, filed 19 Sep. 2014, which is incorporated herein by reference.

BACKGROUND OF THE DISCLOSURE

Coriolis flow meters can be used in a number of applications. In drilling, the Coriolis meter can measure volume flow rates and density of the drilling fluid. For example, in a managed pressure drilling (MPD) system, fluid flow is typically measured using a Coriolis flow meter to determine lost circulation, to detect fluid influxes or kicks, to measure mud density, to monitor fluid returns, etc.

As is known, the Coriolis flow meter can measure the mass flow rate of a medium flowing through piping. The medium flows through a flow tube inserted in line in the piping and is vibrated during operation so that the medium is subjected to Coriolis forces. From these forces, inlet and outlet portions of the flow tube tend to vibrate out of phase with respect to each other, and the magnitude of the phase differences provides a measure for deriving the mass flow rate. In particular, difference in phase shift between inlet/outlet determines the mass flow rate while the effects of fluid on tube natural frequency is used to determine fluid density.

Using Coriolis flow meters in a drilling system provides a number of advantages. The Coriolis flow meter is not restricted to measuring only one particular type of fluid, and the meter can measure slurries of gas and liquids without changes in properties (temperature, density, viscosity, and composition) affecting the meter's performance. Additionally, the Coriolis flow meter simply uses flow tubes and does not require mechanical components to be inserted in the harsh flow conditions of the drilling fluid.

Figures 1, 2:
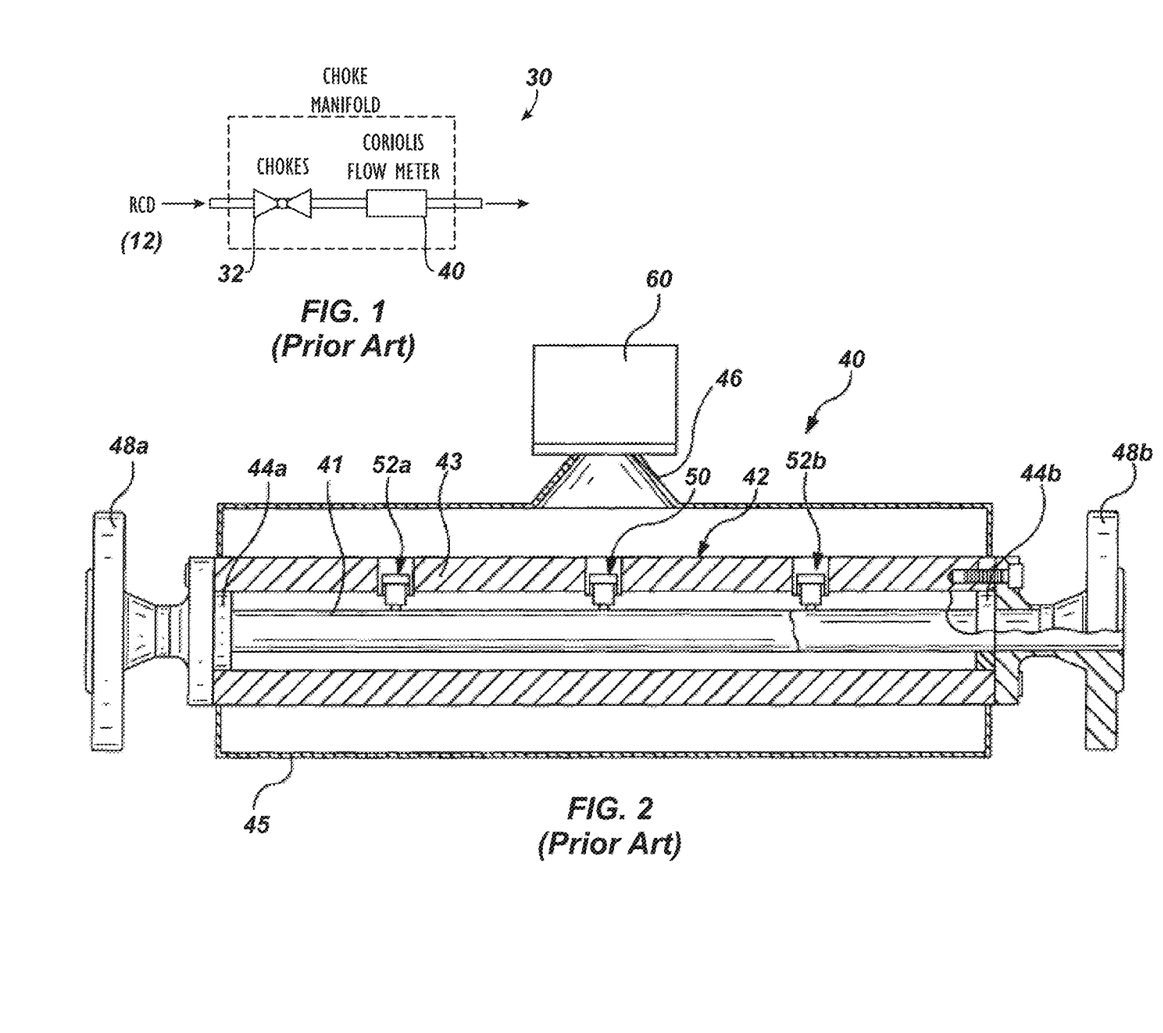
FIG. 1 schematically illustrates a choke manifold according to the prior art.
FIG. 2 illustrates a Coriolis flow meter according to the prior art.

An example of how a Coriolis flow meter is used in a drilling system is schematically illustrated in FIG. 1. The Coriolis flow meter 40 is part of a choke manifold 30, which contains piping, choke valves 32, and associated equipment. Fluid flow from the rotating control device (RCD) 12 of a well passes through the choke manifold 30 before passing on to other parts of a MPD system (not shown), such as a mud gas separator, rig trough, etc.

One particular example of a Coriolis flow meter is disclosed in U.S. Pat. No. 6,513,393, which is reproduced as FIG. 2. A mass flow sensor 40 of a Coriolis mass flow/density meter shown here has a single straight flow tube 41, which has an inlet side and an outlet side. Arrangements other than a single straight flow tube 41 are already known in the art. The inlet side of the flow tube 41 is provided with a first flange 48a, and the outlet side is provided with a second flange 48b so that the mass flow sensor 40 can be inserted in a pressure-tight manner in a pipe through which a medium flows during operation.

The mass flow sensor 40 further includes a support means 42 with a first end plate 44a fixed to the inlet side of the flow tube 41, a second end plate 44b fixed to the outlet side of the flow tube 41, and a support tube 43 inserted between the first and second end plates 44a-b. The end plates 44a-b are connected with the flow tube 41 and the support tube 43 in a rigid and pressure-tight manner, particularly in a vacuum-tight manner. The flow tube 41 is thus mounted in a lumen of the support tube 43 between the end plates 44a-b in a self-supporting manner so that it can be set into vibration.

A vibration exciter 50 is positioned within the support means 42 between the flow tube 41 and the support tube 43, preferably midway between the first and second end plates 44a-b. In operation, this vibration exciter 50 sets the flow tube 41 into vibration at a mechanical resonant frequency, which, in turn, offers a measure of the instantaneous density of the medium.

The vibration exciter 50 may be a solenoid assembly operated by a time-variable exciting current, thus setting the flow tube 41 into vibration, with the inlet side and the outlet side vibrating out of phase with respect to each other as the medium passes through the flow tube 41. Within the support means 42, a first measuring means 52a and a second measuring means 52b are positioned at a given distance from each other along the flow tube 41 for measuring the vibrations. The measuring means 52a-b are preferably located at equal distances from the middle of the flow tube 41 and provide first and second measurement signals that are representative of the vibrations.

Naturally, the mass flow sensor 40 has some form of protection, such as a protective housing or case. Such a protective case keeps the sensor 40 from detrimental effects, external damage and the like. Additionally, such a protective case can provide a sealed, pressure-tight environment that allows the sensor 40 to be used with hazardous materials and at significant pressures should the flow tube 41 fail due to fatigue or bursting.

As shown here, for example, the mass flow sensor 40 is protected from environmental influences by a sensor housing 45. Both the support means 42 and all electric leads connected to the mass flow sensor 40 are accommodated in the housing 45. A transition 46 on the sensor housing 45 has an electronics housing 60 affixed. Typically, to protect components of the meter 40, the housing 45 and support 42 may be fluid tight to prevent moisture and contaminants from entering, which could disrupt operation and cause corrosion and damage.

In the electronics housing 60, exciter electronics and evaluation electronics as well as other circuits used for the operation of the Coriolis mass flow/density meter are accommodated. These circuits can include electronics for supplying power fed from an external power source, and/or communication electronics for data transmission between the Coriolis mass flow/density meter and an external signal processing unit.

Having an understanding of how a Coriolis flow meter is used in a drilling system and what a conventional Coriolis flow meter includes, discussion now turns to some of the limitations encountered when using the conventional Coriolis flow meter in a drilling system.

Currently, the manifold 30 for a MPD system as in FIG. 1 may be rated for up to 10,000-psi pressure. However, even though the meter's pressure rating depends on its size and materials, the Coriolis meter 40 is typically limited to a rating of less than 3,000-psi, and usually about 1,500 to 2,855-psi. For this reason, the Coriolis meter 40 must be downstream of the chokes 32 due to this pressure limitation. Additionally, the Coriolis flow meter 40 may be installed with a bypass valve (not shown) and pressure sensor. If a pressure limit is exceeded, the bypass valve is actuated to bypass flow around the meter 40 so drilling can continue at rates that may exceed the capacity of the meter 40. As expected, this adds further complexity to the system.

One way to increase the pressure rating of the Coriolis flow meter 40 is to increase the wall thicknesses of the flow tube(s) used for the meter 40. The increased wall thickness leads to the expectation that the meter 40 can handle higher fluid pressures. However, increasing the wall thickness can reduce or eliminate the response capabilities of the meter 40. In other words, raising the pressure capability of the flow meter 40 by making the flow tube(s) more robust or thicker tends to compromise the functional accuracy of the flow meter 40. This can make the flow meter capable of high pressure operation functionally impractical for managed pressure drilling applications.

For high pressure applications, a turbine flow meter instead of the Coriolis flow meter 40 could be used to make the desired measurements, but the accuracy of the turbine flowmeter at measuring a full range of flow rates is inferior to a Coriolis flow meter. In fact, managed pressure drilling requires a high level of flow-measurement accuracy so that use of a turbine flowmeter is not acceptable.

Furthermore, because the pressure limitation of the Coriolis meter 40 requires it to be downstream of the chokes 32, any gas in the drilling fluid can come out of solution during the pressure drop experienced across the chokes 32. When this occurs, the Coriolis meter 40 may not function properly.

Keeping the gas in solution for the Coriolis flow meter 40 after the chokes 32 has been partially controlled by adding a valve (not shown), orifice, or the like downstream of the Coriolis flow meter. The downstream valve or the like can supply adequate back pressure to the meter 40, thereby keeping the gas in solution and allowing the meter 40 to read the fluid flow rate with improved accuracy. Although this arrangement may offer better pressure control to keep the gas in solution, positioning such a valve downstream of the meter 40 does not enable to the Coriolis flow meter 40 to operate at higher pressures, and such a valve downstream of the meter 40 adds complexity to the drilling system.

The subject matter of the present disclosure is directed to overcoming, or at least reducing the effects of, one or more of the problems set forth above.

SUMMARY OF THE PRESENT DISCLOSURE

An apparatus according to the present disclosure include a Coriolis flow meter for measuring flow of fluid—i.e., measuring several fluid parameters (e.g., flow, density, temperature). The meter has an inlet side and an outlet side. At least one flow tube is adapted to vibrate and conducts the flow of the fluid at a first pressure level from the inlet side to the outlet side. A vessel encloses the at least one flow tube in a chamber and holds a second pressure level in the chamber about the at least one flow tube. For example, the vessel can hold an internal fluid in the chamber, such as a liquid, a gas, helium, argon, air, nitrogen, an electrically inert fluid, process fluid, hydraulic fluid, transformer oil, silicon oil, mineral oil, fluorocarbon-based fluid, and castor oil.

The second pressure level is regulated relative to the first pressure level and controls a pressure differential across the at least one flow tube. In one arrangement, the second pressure level is elevated above environmental (e.g., ambient, atmospheric, etc.) relative to the first pressure level and reduces a pressure differential across the at least one flow tube. The second pressure level can be elevated to a level at, near, above, or below the first pressure level. For instance, the second pressure level can be elevated to above the first pressure level to produce a positive of the pressure differential from the chamber to the at least one flow tube. Alternatively, the second pressure level can be elevated to below the first pressure level to produce a negative of the pressure differential from the chamber to the at least one flow tube.

In the apparatus, the meter can be disposed in a drilling system upstream of a choke, between at least one pump and a well, downstream from at least one charge pump connected to a mud tank, and/or downstream from at least one mud pump connected to a well.

For the meter, the at least one flow tube can include first and second flow tubes disposed in parallel to one another, and the at least one flow tube can define a bend. The meter can have at least one exciter and at least first and second sensors. The at least one exciter is disposed adjacent the at least one flow tube and imparts vibration thereto. The first and second sensors are disposed respectively adjacent the inlet and outlet sides and measure response to the imparted vibration.

A controller of the apparatus can monitor variation in the first pressure level and can adjust the second pressure level in accordance therewith. The apparatus can have a pressure sensor associated with the vessel to measure the second pressure level for comparison to the first pressure level. This can be done to actively control the second pressure level from a source relative to the first pressure level.

For example, the apparatus can include a source of the second pressure level in communication with the vessel. In one implementation, the source can include an accumulator translating a pressure associated with the first pressure level to the second pressure level of the vessel. Additionally or in the alternative, the source can include a pump producing the second pressure level of the vessel.

A drilling system according to the present disclosure for a wellbore includes at least one choke, a Coriolis flow meter, and a vessel. The at least one choke is in fluid communication with the wellbore and controls flow of fluid from the wellbore. The meter is disposed in fluid communication upstream of the at least one choke and measures the flow from the wellbore. The meter has at least one flow tube being adapted to vibrate and conducting the flow at a first pressure level from an inlet side to an outlet side. The vessel encloses the at least one flow tube in a chamber and holds a second pressure level in the chamber about the at least one flow tube. This second pressure level is regulated relative to the first pressure level and controls a pressure differential across the at least one flow tube. For instance, the second pressure level is elevated above environmental relative to the first pressure level and reduces a pressure differential across the at least one flow tube.

In the system, one or more controllers can be operatively coupled to the at least one choke and/or the meter. For example, the one or more controllers can monitor one or more parameters of the flow and can control operation of the at least one choke in response to the one or more monitored parameters. The one or more controllers can determine a mass flow of the fluid based at least in part on a measurement from the meter and can determine a density of the fluid based at least in part on a measurement from the meter.

For its part, the at least one choke in the system can be in fluid communication with a rotating control device of the wellbore. The Coriolis flow meter can be disposed in fluid communication between the at least one choke and the rotating control device. Finally, the system can have another Coriolis flow meter disposed in fluid communication downstream of the at least one choke and configured to operate in conjunction with the Coriolis flow meter disposed in fluid communication upstream of the at least one choke.

In one embodiment, a controlled pressure drilling method for a wellbore involves controlling surface backpressure in the wellbore by controlling flow of fluid at a first pressure level from the wellbore with at least one choke. The method involves measuring the flow from the wellbore upstream of the at least one choke by operating a Coriolis flow meter having at least one flow tube conducting the flow. In the method, a pressure differential across the at least one flow tube is regulated relative to the first pressure level to controls a pressure differential across the at least one flow tube. For instance, the second pressure level is reduced by elevating a second pressure level above environmental in a chamber disposed about the at least one flow tube relative to the first pressure level.

A drilling system according to the present disclosure for a wellbore includes at least one pump, a Coriolis flow meter, and a vessel. The at least one pump is in fluid communication with the wellbore and delivers flow of fluid to the wellbore. The Coriolis flow meter is disposed in fluid communication between the at least one pump and the wellbore and measures the flow of fluid to the wellbore. The meter includes at least one flow tube being adapted to vibrate and conducting the flow at a first pressure level from an inlet side to an outlet side. A vessel encloses the at least one flow tube in a chamber and holds a second pressure level in the chamber about the at least one flow tube. The second pressure level is regulated relative to the first pressure level and controls a pressure differential across the at least one flow tube. For instance, the second pressure level is elevated above environmental relative to the first pressure level and reduces a pressure differential across the at least one flow tube.

In another embodiment of a controlled pressure drilling method, flow of fluid is delivered from at least one pump at a first pressure level to the wellbore, and the flow is measured by operating a Coriolis flow meter having at least one flow tube conducting the flow. The method involves regulating the second pressure level relative to the first pressure level to control a pressure differential across the at least one flow tube. For instance, the method involves reducing a pressure differential across the at least one flow tube by elevating a second pressure level above environmental in the chamber about the at least one flow tube relative to the first pressure level.

The foregoing summary is not intended to summarize each potential embodiment or every aspect of the present disclosure.

DETAILED DESCRIPTION OF THE DISCLOSURE

Figure 3:
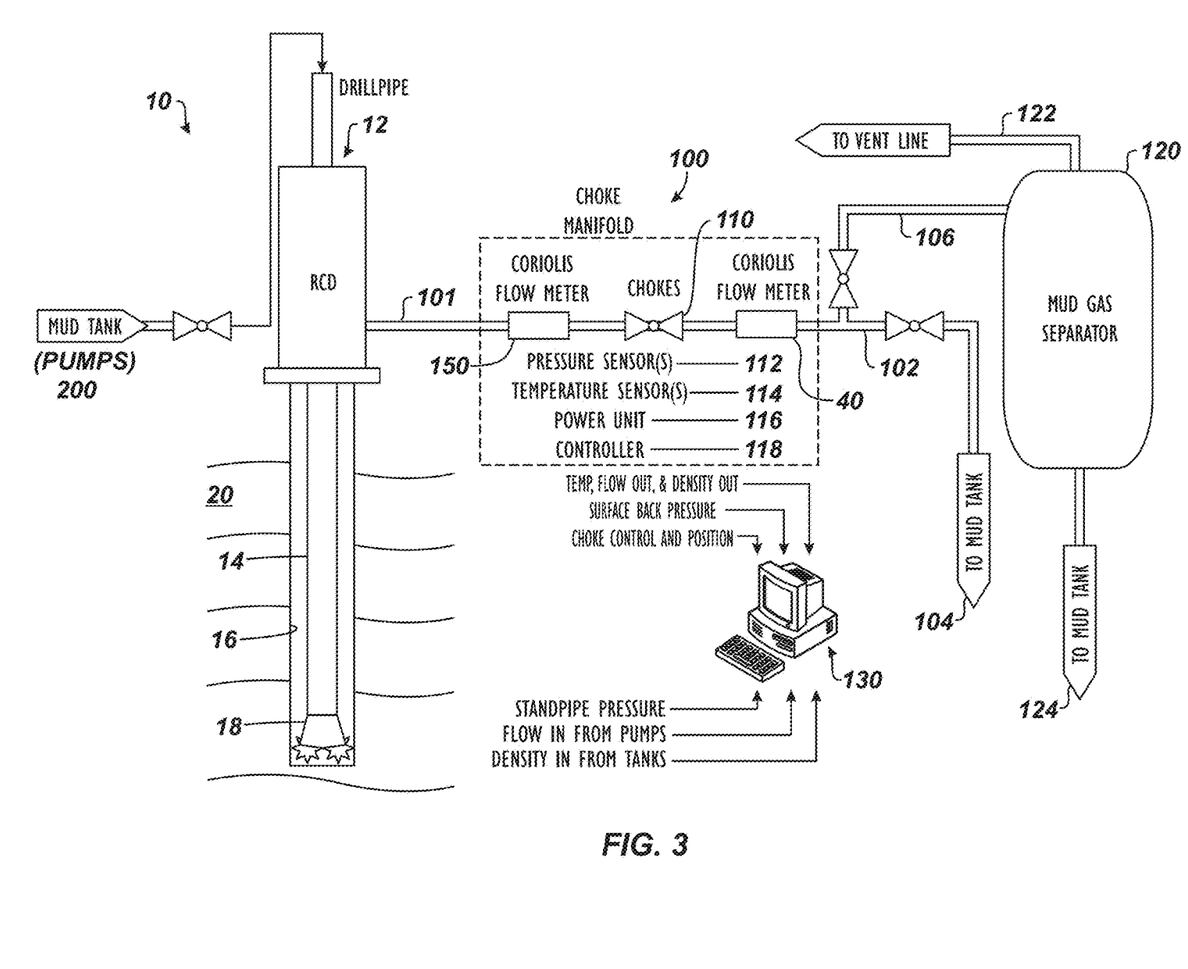
FIG. 3 diagrammatically illustrates a managed pressure drilling system having a Coriolis flow meter according to the present disclosure for a choke manifold.

FIG. 3 diagrammatically illustrates a managed pressure drilling system 10 having a Coriolis flow meter 150 according to the present disclosure for a choke manifold 100. As shown and discussed herein, this system 10 can be a Managed Pressure Drilling (MPD) system, such as a Constant Bottomhole Pressure (CBHP), Pressurized Mud-Cap Drilling, Returns-Flow-Control Drilling, Dual Gradient Drilling, etc. as well as Underbalanced Drilling (UBD) systems. Although discussed in this context, the teachings of the present disclosure can apply equally well to other types of flow systems and processes, as will be appreciated by one skilled in the art having the benefit of the present disclosure.

The system 10 has a rotating control device (RCD) 12 from which a drill string 14 and drill bit 18 extend downhole in a wellbore 16 through a formation 20. The rotating control device 12 can include any suitable pressure containment device that keeps the wellbore closed at all time while the wellbore 16 is being drilled. The rotating control device (RCD) 12 is used in the mud-return to contain the annular fluids while drilling and to route the fluids through the control manifold 100 equipped with sensors to extract critical data from the fluids.

The system 10 also includes mud pumps 200, a standpipe (not shown), a mud tank (not shown), a mud gas separator 120, and various flow lines (101, 102, 104, 106, 122, 124), as well as other conventional components. In addition to these, the MPD system 10 includes a choke manifold 100 that is incorporated into the other components of the system 10. The choke manifold 100 is typically automated and controlled by processing equipment 118 and 130.

During operations, the choke manifold 100 manages pressure during drilling and is incorporated into the system 10 downstream from the rotating control device 12 and upstream from the gas separator 120. The manifold 100 has chokes 110 and a mass flow meter 150. In addition, the manifold 100 typically has pressure sensors 112, temperature sensors 114, a hydraulic power unit 116 to actuate the chokes 110, and a controller 118 to control operation of the manifold 100.

The controller 118 houses data acquisition components for measuring and analyzing physical properties of the fluid returns from the wellbore 16. The controller 118 also controls the drilling chokes 110 to regulate backpressure, as needed. A data acquisition system 130 communicatively coupled to the manifold 100 has a control panel with a user interface and processing capabilities.

In the current embodiment, the mass flow meter 150 is a Coriolis type of flow meter. The Coriolis mass flow meter 150 captures mass and volume flow data of returning annular fluids. The Coriolis flow meter 150 can also measure density along with flow and volume data. The data is routed to the system's controller 118 and data acquisition system 130. The Coriolis flow meter 150 is typically installed in a flag or angled-up position so cuttings and drilling fluid can drain from the meter 150 and gas can flush from the meter 150, although the Coriolis flow meter 150 can also be positioned horizontally. A bypass piping arrangement (not shown) can be used to bypass the meter 150 should that be necessary.

One suitable drilling system 10 with a choke manifold 100 for the present disclosure is the Secure Drilling™ System available from Weatherford. Details related to such a system are disclosed in U.S. Pat. No. 7,044,237, which is incorporated herein by reference in its entirety.

As shown, the system 10 uses the rotating control device 12 to keep the well closed to atmospheric conditions. Fluid leaving the wellbore 16 flows through the choke manifold 100, which measures return flow and density using the Coriolis flow meter 150 installed in line with the chokes 110. Software components of the manifold 100 then compare the flow rate in and out of the wellbore 16, the injection pressure (or standpipe pressure), the surface backpressure (measured upstream from the drilling chokes 110), the position of the chokes 110, and the mud density. Comparing these variables, the system 10 identifies minute downhole influxes and losses on a real-time basis and manages the annulus pressure during drilling. All of the monitored information can be displayed for the operator on the control panel of the data acquisition system 130.

During drilling operations, the system 130 monitors for any deviations in values and alerts the operators of any problems that might be caused by a fluid influx into the wellbore 16 from the formation 20 or a loss of drilling mud into the formation 20. In addition, the system 130 can automatically detect, control, and circulate out such influxes by operating the chokes 110 on the choke manifold 100.

For example, a possible fluid influx can be noted when the "flow out" value (e.g., measured from the Coriolis flow meter 150) deviates from the "flow in" value (e.g., measured from the mud pumps 200). When an influx is detected, an alert notifies the operator to apply the brake until it is confirmed safe to drill. Meanwhile, no change in the mud pump rate is needed at this stage.

In a form of auto kick control, however, the system 130 automatically closes the choke 110 to a determined degree to increase surface backpressure in the wellbore annulus 16 and stop the influx. Next, the system 130 circulates the influx out of the well by automatically adjusting the surface backpressure, thereby increasing the downhole circulating pressure and avoiding a secondary influx. A conceptualized trip tank is monitored for surface fluid volume changes because conventional pit gain measurements are usually not very precise. This is all monitored and displayed to offer additional control of these steps.

On the other hand, a possible fluid loss can be noted when the "flow in" value (e.g., measured from the pumps 200) is greater than the "flow out" value (e.g., measured by the Coriolis flow meter 150). Similar steps as those above but suited for fluid loss can then be implemented by the system 130 to manage the pressure during drilling in this situation.

As noted above, pressure limitations of a conventional Coriolis flow meter can be a problem, requiring it to be disposed downstream from the chokes. Additionally, keeping the gas in solution in the flow out of the wellbore 16 has been a problem for the conventional Coriolis flow meter disposed downstream from the chokes.

In the current embodiment and in contrast to the conventional arrangement, the disclosed Coriolis flow meter 150 is disposed upstream of the chokes 110. In this upstream position, the Coriolis flow meter 150 can avoid the problems typically encountered by conventional Coriolis flow meters positioned downstream of the chokes 110.

In particular, this upstream position of the Coriolis flow meter 150 helps ensure that any gas in the drilling fluid remains in solution. For example, having the disclosed Coriolis flow meter 150 disposed uphole of the chokes 110 makes it less likely that bubbles will form in the flow that will pass through the flow tubes 160, as would typically occur with the conventional flow meter downhole of the chokes 110. Also, the disclosed Coriolis flow meter 150 disposed upstream of the chokes 110 can avoid issues with cavitation produced by the chokes 110 and can measure the flow without the typical convoluted flow path through the manifold 100.

Moreover, the disclosed Coriolis flow meter 150 upstream of the chokes 110 may avoid the need to add a pressure relief or bypass valve upstream of the Coriolis meter 150 when used ahead of the chokes 110. However, it may still be useful to have a bypass arrangement even for the Coriolis meter 150 uphole of the chokes 110. Therefore, the manifold 100 of the present disclosure may include such a bypass arrangement (not shown).

As will be appreciated, even though the disclosed Coriolis flow meter 150 is disposed upstream of the chokes 110, the disclosed meter 150 can be disposed in the conventional position downstream of the chokes 110. Additionally, the disclosed meter 150 disposed uphole of the chokes 110 can be used in combination with a conventional Coriolis flow meter (e.g., 40: FIG. 3) disposed downstream of the chokes 110. In these combined arrangements, the benefits of both meters and their positions can be used in monitoring during drilling.

FIGS. 4A-4D diagram several arrangements for a Coriolis flow meter 150 for the system 10 of FIG. 3. During operation, a medium flows through one or more flow tube(s) 160 of the flow meter 150. Being used in a drilling environment, the one or more flow tube(s) 160 can conduct gas, liquid, and solids typically employed and encountered in this context. Thus, piping 101 from the RCD 12 or other part of a drilling system delivers the flow to the meter 150 and the one or more flow tube(s) 160, and the piping 101 then sends the flow onto the chokes 110 and other components of the manifold and system.

As will be appreciated, the Coriolis flow meter 150 can use one or more flow tubes 160, which can have a number of different shapes and can be arranged in parallel or series to one another. In the present system, the Coriolis flow meter 150 has two flow tubes 160 connected in parallel at a common inlet 162 and a common outlet 164, and the flow tubes 160 define bends or U-shapes. Other arrangements known in the art can be used. For example, the Coriolis flow meter 150 can have one such U-shaped flow tube 160 or can have one or more flow tube(s) 160 that are straight, spiraled, or have another acceptable shape. Preferably, the flow tubes 160 are composed of a suitable material, such as titanium, although stainless steel can be used.

Although not shown, various supports, flanges, connectors, or the like can be used at the common inlet and outlets 162, 164 to support the flow tubes 160. An external pressure vessel 170 is disposed about the Coriolis flow meter 150 to contain the functional components of the Coriolis flow meter 150, namely the flow tubes 160, sensors, vibrator, etc. The external pressure vessel 170 preferably has at least the same pressure capability as the choke manifold 100 (e.g., about 10,000-psi).

Although this vessel 170 can be placed so any leaks of the Coriolis flow meter 150 can be contained and so external damage can be prevented, the external pressure vessel 170 also contains a regulated (e.g., elevated) pressure configured in its chamber 172 that surrounds the flow tubes 160. In this sense, the pressure vessel 170 offers more than just a protective housing or case for the flow tubes 160 and other components of the meter 150. The pressure in the chamber 172 is regulated relative to the pressure level in the flow tubes 160 and controls a pressure differential across the flow tubes 160. In a particular arrangement, the pressure in the chamber 172 is elevated above environmental (e.g., ambient, atmospheric, etc. levels) as dictated by the conditions in the surrounding environment (wellsite, rig floor, sea floor, etc).

Depending on the implementation, an additional containment vessel (not shown) can be disposed about the pressure vessel 170 in FIGS. 4A-4D. This additional vessel (not shown) can serve several purposes, such as isolating features of the meter 150 from noise, containing pressure in case the high-pressure vessel 170 ruptures, and isolating features of the meter 150 from thermal temperature effects, e.g. solar heating.

A control unit 152 has control and sensing electronics for use with the Coriolis flow meter 150, and some of these electronic components 154 are housed inside the pressure vessel 170. These will be described in more detail later.

An internal fluid (e.g., gas or liquid) is disposed in the chamber 172 between the pressure vessel 170 and the external surfaces of the flow tubes 160. The pressure of this internal fluid is regulated (e.g., elevated) so that the pressure differential across the flow tube(s) 160 is controlled (e.g., reduced or minimized). Thus, the pressure level in the chamber 172 can be elevated to a level at or above the pressure level in the flow tube(s) 160 to produce a positive pressure differential from the chamber 172 to the flow tube(s) 160. Likewise, the pressure level in the chamber 172 can be elevated to a level at or below the pressure level in the flow tube(s) 160 to produce a negative pressure differential from the chamber 172 to the flow tube(s) 160. Elevation of the chamber pressure relative to the flow tube(s) 160 to either a positive or negative differential or no differential may be acceptable for different operations depending on the implementation, fluids used, flow rates, etc. In this way, the internal fluid in the chamber 172 permits the flow tube(s) 160 to conduct fluid at a higher pressure without being externally exposed to an increased pressure differential.

As noted, the pressure in the chamber 172 is increased to minimize the pressure differential between the flow tube(s) 160 and the external environment of the chamber 172. Thus, even though the flow tube(s) 160 may be rated for 3-kpsi, the external pressure outside the flow tube(s) 160 in the chamber 172 can minimize the pressure differential when the fluid in the chamber 172 is increased in pressure up to, at, or above the 3-kpsi pressure level in the flow tube(s) 160. The pressure can be increased as long as the collapse pressure of the flow tube(s) 160 is not exceeded or as long as the pressure in flow tube(s) 160 does not exceed the maximum pressure differential across the flow tube(s) 160.

The pressure in the chamber 172 can be pre-charged and fixed at a predetermined level for intended operations. Preferably, the pressure of the fluid in the chamber 170 is regulated with a pressure system 180. A number of systems 180 can be used to regulate the pressure in the chamber 172, and these systems 180 may be actively or passively controlled.

Figure 4A:
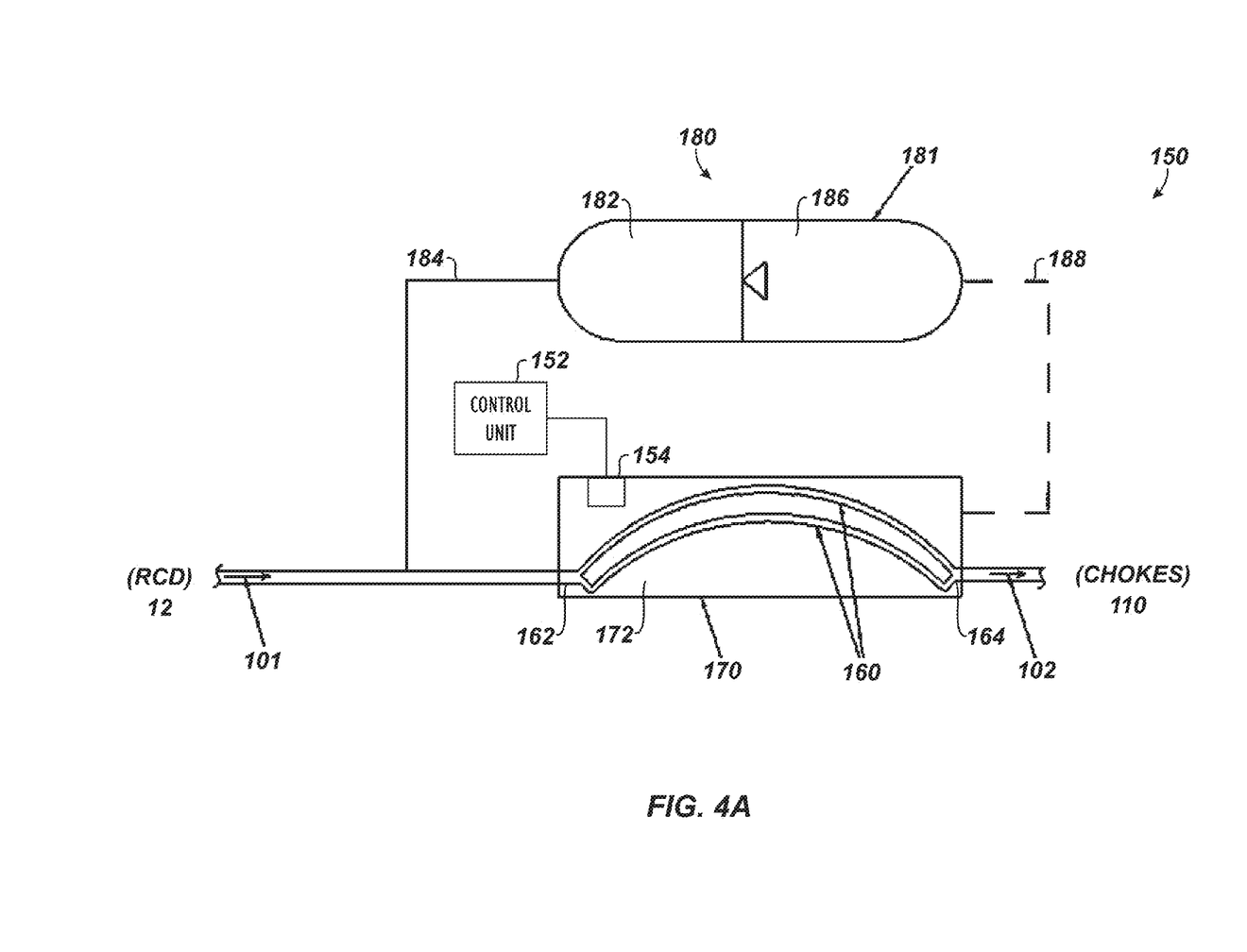
FIGS. 4A-4D diagram several arrangements for a Coriolis flow meter for the system of FIG. 3.

As shown in the current embodiment of FIG. 4A, the pressure system 180 preferably communicates the pressure level found inside the manifold 100 to the pressure level inside the external vessel 170. In particular, an accumulator, piston, other pressure transfer device 181 connects to the inlet piping 101 for the Coriolis flow meter 150, which is coupled to the manifold's pressure. On the opposing side, the accumulator 181 connects to the chamber 172 of the external vessel 170 with a coupling 188.

As flow is conducted to the Coriolis flow meter 150, the manifold's pressure communicates via the coupling 184 to a first volume 182 of the accumulator 181, which in turn acts against a second volume 186 of the accumulator 181. The communicated pressure from the second volume 186 then communicates by the coupling 188 to the vessel's chamber 172 to transfer the manifold's pressure.

The fluid in the second volume 186 is isolated from the process flow in the piping 101 so that issues with corrosion and plugging can be avoided. The fluid in the vessel's chamber 172 can be a liquid or gas and can be electrically inert. Some examples of the fluid for the chamber 172 include, but are not limited to, inert gases such as helium or argon, other gases such as air or nitrogen, process fluid, hydraulic fluid, transformer oil, silicon oil, mineral oil, fluorocarbon-based fluid, castor oil, etc.

Using this arrangement, the pressure external to the flow tubes 160 can be increased, thereby allowing the internal pressure of the fluid that the flow tubes 160 can conduct to comparably increase. In the end, the need for thicker walls of the flow tubes 160 can be avoided, and moreover, thinner tubes 160 can be used to reduce the overall size of the Coriolis flow meter 150.

Figure 4B:
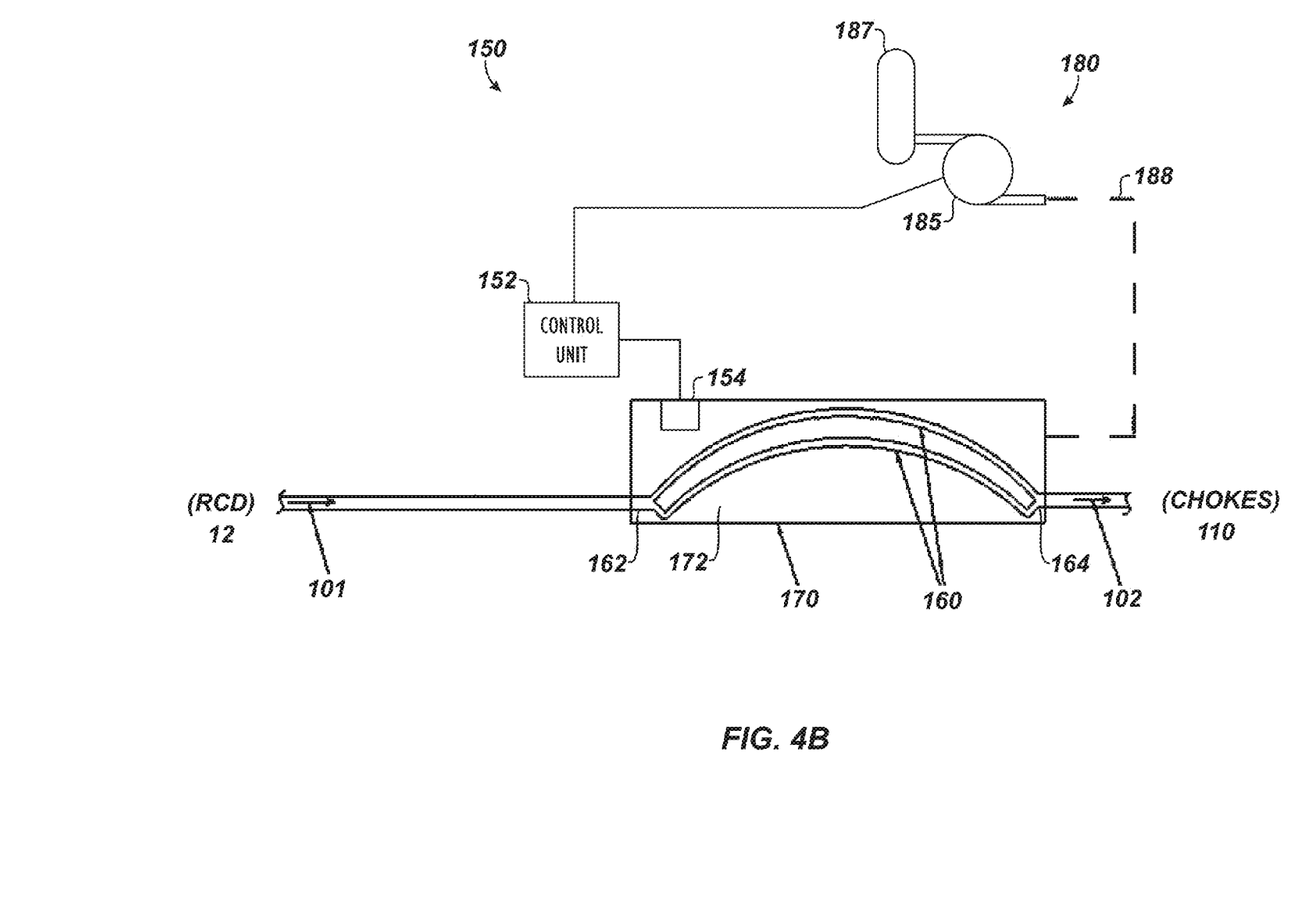

FIG. 4B shows the disclosed Coriolis flow meter 150 with another pressure system 180. Here, the pressure system 180 actively communicates a pressure level to the external vessel 170 using a pump 185, piston, or the like. Stored fluid from a source 187 can be pumped by the pump 185 to the vessel's chamber 172 via the coupling 188. This can be used to increase the pressure level in the vessel's chamber 172. Pressure relief valves and other known components can be used with this system 180 to reduce the pressure level, and are simply not shown here for simplicity.

Figure 4C:
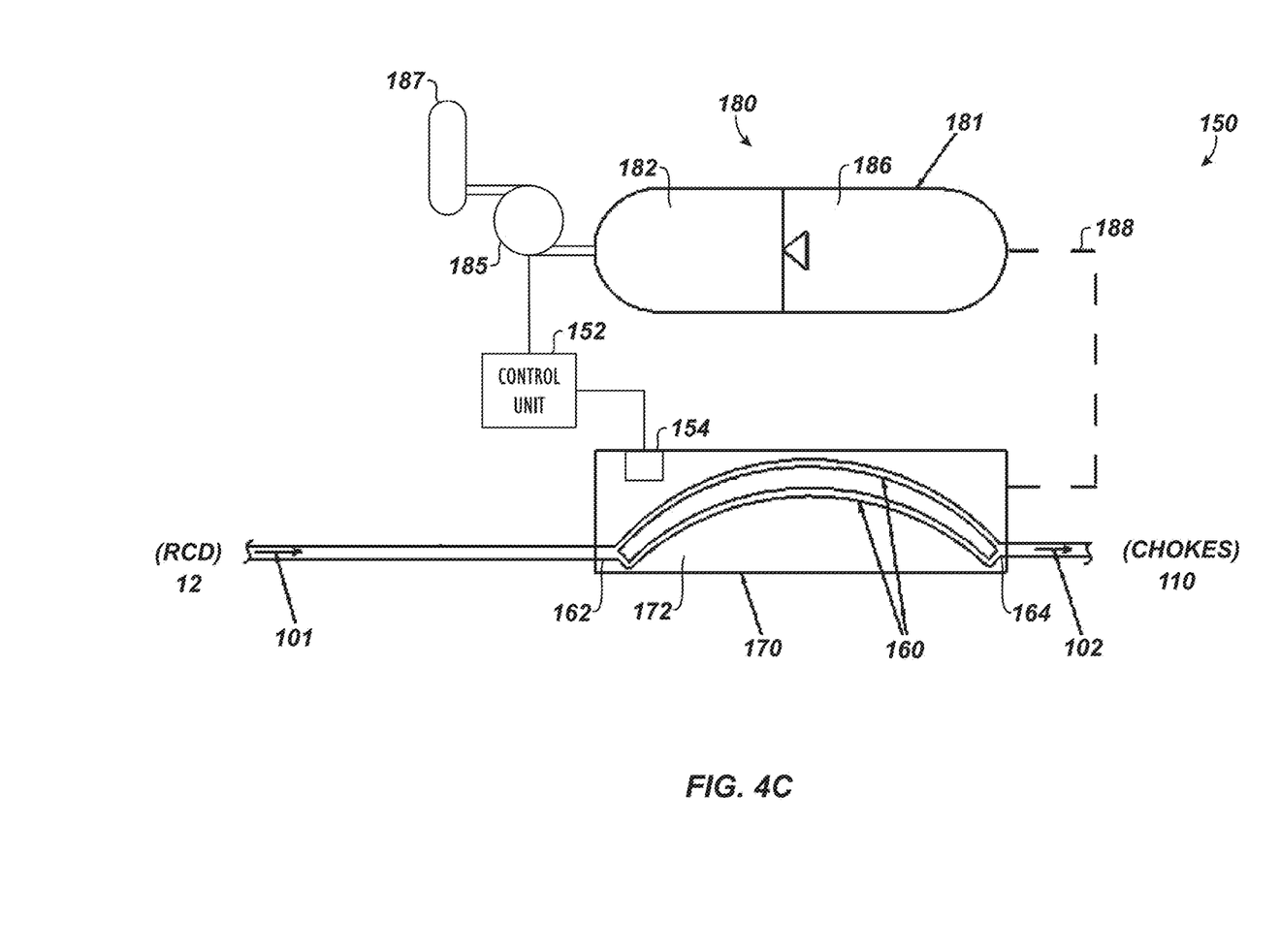

FIG. 4C shows the disclosed Coriolis flow meter 150 with yet another pressure system 180. Here, the pressure system 180 actively communicates a pressure level to the external vessel 170 using a pump 185, a source 187, and an accumulator 181.

Figure 4D:
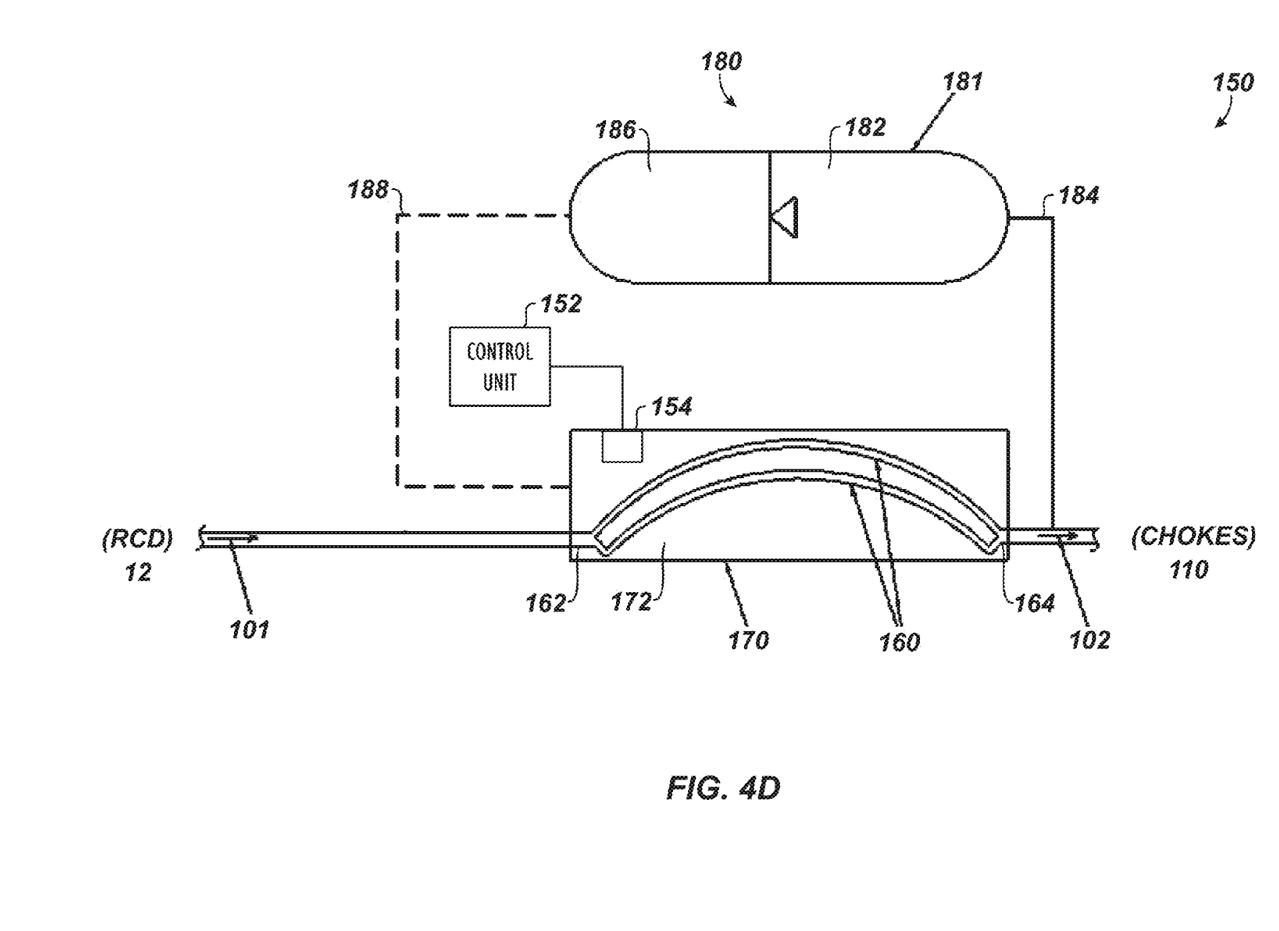

As shown in the alternative embodiment of FIG. 4D, the pressure system 180 can communicate the pressure level found inside the manifold 100 to the pressure level inside the external vessel 170. In particular, an accumulator, piston, other pressure transfer device 181 connects to the outlet piping 102 for the Coriolis flow meter 150, which is coupled to the manifold's pressure. On the opposing side, the accumulator 181 connects to the chamber 172 of the external vessel 170 with a coupling 188.

As these arrangements in FIGS. 4A-4D show, a number of arrangements can be used to regulate the pressure in the chamber 172 of the vessel 170. In each of the pressure control arrangements discussed above, the pressure in the chamber 172 is preferably not rapidly changed. Instead, the system 180 can have a predetermined pressure differential buffered in the chamber 172. Any change (increase or decrease) of the chamber's pressure would then be gradually adjusted relative to that buffer over time in response to the changes in pressure in the manifold and the flow tubes 160. This can provide more accurate readings and control of the system.

Figure 5:
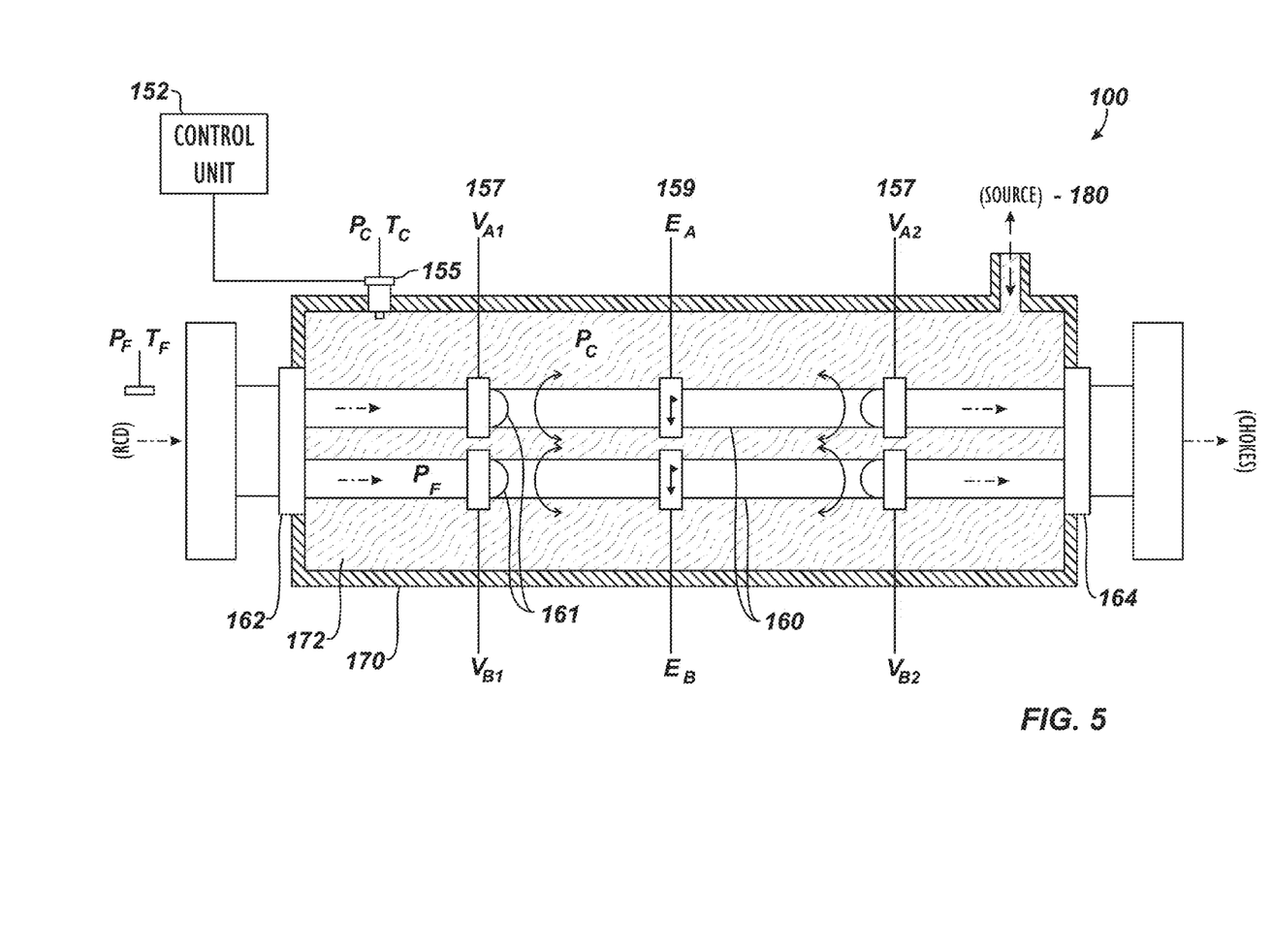
FIG. 5 illustrates one embodiment of a Coriolis flow meter for the system of FIG. 3.

Having an understanding of the Coriolis flow meter 150, even more details are shown in one embodiment of a Coriolis flow meter 150 illustrated in FIG. 5. A plan view of the Coriolis flow meter 150 is somewhat diagrammatically shown looking down at the flow tubes 160, which run parallel to one another. The flow tubes 160 may be U-shaped and have comparable bends or bows 161. Again, one or more straight, bowed, or other shaped flow tubes 160 can be used.

Vibrators $159E_{A-B}$ are actuated to set the flow tubes 160 into vibration during operation. Sensors $157V_{A1-A2}$, $157V_{B1-B2}$ positioned respectively on the inlet and outlet of the flow tubes 160 measure the vibrations, and the phase differences of these vibrations are used to derive the mass flow rate through the Coriolis flow meter 150. The sensors 157V$_{A1\text{-}A2}$, 157V$_{B1\text{-}B2}$ are preferably located at equal distances from the middle of the flow tube(s) 160 to provide measurements representative of the vibrations.

A number of known components can be used for the sensors 157V$_{A1\text{-}A2}$, 157V$_{B1\text{-}B2}$ and the vibrators 159E$_{A\text{-}B}$. For example, the sensors 157 can include magnets and coils located about the flow tubes 160 at the inlet and outlet sides to measures the Coriolis effect. The vibrators 159 can be solenoids or drive coils. The vibrator(s) 159 sets the flow tube(s) 160 and the conducted fluid into vibration at a mechanical resonant frequency.

Due to the vibrations, for example, the coils for the sensors 157 move through the magnetic fields of the magnets to generate signals of the motion. These signals are typically sine waves proportional to the motion. Because the flow tube(s) 160 twist due to the Coriolis effect when flow is passing through them, a phase differences develops between the sensed motion that is proportional to the mass flow rate. The frequency of the vibrations provides a measure of the density of the fluid in the flow tube(s) 160. Calculating the fluid volume flow rate simply involves dividing the mass rate by the density.

As noted above, the flow tubes 160 and some of the electronics (e.g., sensors 157, vibrators 159, etc.) are housed in the external pressure vessel 170 which is filled with the pressurized fluid from a pressure source or system 180 (e.g., accumulator, pump, etc.). One or more sensors 155 for the chamber 172 of the vessel 170 can monitor the surrounding chamber pressure P$_C$ so the chamber pressure P$_C$ can be actively controlled relative to the measured and changing fluid pressure P$_F$ in the flow tubes 160. This fluid pressure can be measured elsewhere in the system (10) or at the Coriolis flow meter 150 using an appropriate sensor (not shown) and techniques. The one or more sensors 155 can also monitor the chamber temperature T$_C$, which can be compared to the fluid temperature T$_F$.

During operation, the control unit 152 controls the excitation signals of the vibrators 159 to set the flow tubes 160 into vibration at a mechanical resonant frequency. The control unit 152 also obtains the sensed vibrations from the vibration sensors 157 and obtains measurements from the other sensors 155 and other parts of the system. Using known processing techniques, the control unit 152 then calculates the mass flow rate, the density, the fluid volume flow rate, and other characteristics of the fluid through the meter 150.

More particularly, flow is guided through the U-shaped flow tube 160 as an excitation force causes the tube 160 to vibrate. The flowing fluid induces a rotation or twist to the tube 160 due to the Coriolis acceleration acting in opposite directions on either side of the applied vibrational force. The twist produces a phase difference (time lag) between the inlet side and the outlet side of the tube 160, and this phase difference is directly affected by the mass of the fluid passing through the tube 160 at the time. By measuring the time lag τ between the turning corners on the U-shaped flow tube 160, the mass flow rate can then be obtained by:

$$Q_m = \frac{K_u - I_u \omega^2}{2Kd^2} \tau,$$

where K is a factor to compensate for the idealized U-shape of the flow tube 160, I$_u$ is the inertia of the U-shaped flow tube 160 including the mass of the fluid in the tube 160, K$_u$ is the stiffness of the U-shaped flow tube 160, d is the width across the inlet and outlet sides of the U-shaped flow tube 160, ω is the vibrating frequency, and τ is the measured time lag. Because the natural frequency of the U-shaped flow tube can be characterized as $$\omega_u = \sqrt{\frac{K_u}{I_u}},$$

the mass flow rate measurement can be determined by:

$$Q_m = \frac{K_u \left[1 - \left(\frac{\omega}{\omega_u}\right)^2\right]}{2Kd^2} \tau.$$

When integrated with a temperature device, such as a resistance thermal device on or near the flow tube(s) 160, the flow meter 150 can provide a number of useful measurements for well control and observation, including mass flow, volumetric flow, fluid density, and fluid temperature to name a few.

Because characteristics of the flow tubes 160 such as the inertia, stiffness, shape, width, etc. play a role in the calculations, the construction of the Coriolis flow meter 150 influences how the meter measures the flow—i.e., by influencing the vibrational frequency of the tubes 160, how the meter 150 measures multiphase flow, how much measurement error occurs, etc. The Coriolis flow meter 150 is sized based on considerations, such as erosion, flow rate requirements expected, measurement accuracy and error, etc. During drilling, the flow rate requirements may change significantly.

In some cases, the internal pressure of the flow in the flow tubes 160 may produce errors in the measurements. Typically, the meter's accuracy can follow a linear relationship over an operating range and can depend on the size and construction of the Coriolis flow meter 150. In general, the internal pressure from the flow tends to stiffen the flow tubes 160 so that the tubes 160 are less flexible to vibrate. Thus, higher internal pressure of the flow conducted by the tubes 160 may cause the Coriolis meter 150 to make inaccurate measurements. To some extent, the effects from higher internal pressures in the flow tubes 160 can be corrected using compensation factors, adjusted equations, calibration, and other techniques. Also, a temperature rise may tend to stiffen a straight-tube configuration and thus change the natural frequency of the tube. This too can be accounted for.

Because the vibrations of the flow tubes 160 also occur in the pressurized fluid of the chamber 172, response of the flow meter 150 may be altered when compared to a conventional arrangement. In particular, because the flow tubes 160 of the disclosed meter 150 will vibrate in the increased pressure of the vessel 170, the resonant frequency characteristics of the meter 150 may be altered. Due to the pressure in the chamber 172, for example, the natural frequency of the flow tubes 160 may be changed along with the vibrational amplitude. Therefore, the vibrational response of the flow tubes 160 as measured by the meter 150 may be altered and likely may be dampened.

As will be appreciated, the variables due the chamber pressure can be accounted for during processing. For example, the operational equations for the Coriolis flow meter 150 can be appropriately adjusted to account for these variables. Additionally, calibration of the meter 150 under various flow and pressure conditions can be performed to produce compensation factors, or other techniques can be used to account for these variables.

Depending on the circumstances, the increased pressure in the chamber 172 may not adversely affect the operational parameters, vibration, etc. of the flow meter 150. Instead, the parameters expected to have the most impact on vibrations of the flow tubes 160 may include the increased density and viscosity of the internal fluid in the chamber 172. An increase of these parameters is expected to directly affect the drag force on the flow tube(s) 160 as they move through the chamber fluid, causing the vibrations to be attenuated and slower. In particular and as is known, the force due to drag on a cylindrical object, such as the flow tubes 160, is given by:

$$F_D = \tfrac{1}{2} C_D A V^2 \rho,$$

where $F_D$ is the drag force acting on the cylindrical object; $C_D$ is the drag coefficient (typically determined from empirical data, it also varies with Reynolds number ($R_e$); A is the cross-sectional area of a profile view of the cylindrical object; V is the velocity; and $\rho$ is the density of the fluid (i.e., the fluid in the chamber 172).

Here is the equation for the Reynolds number:

$$R_e = \frac{\rho V D}{\mu},$$

where D is the diameter of the cylindrical tube; $\mu$ is the dynamic viscosity of the fluid in the chamber 172; V is the velocity; and $\rho$ is the density of the fluid in the chamber 172.

Based on this understanding, it is expected that the viscosity of the fluid in the chamber 172 can alter the resonant frequency of the flow tube(s) 160 during operations. Therefore, operating parameters, equations, excitation signals, and the like may need to account for the fluid's viscosity and the change in the tube's resonant frequency.

When one of the aforementioned liquids is used in the chamber 172 instead of a gas, the density and viscosity of the liquid may be significantly higher, although the stored potential energy is significantly lower. Therefore, the favored attributes to aid in selection of a particular liquid to use in the chamber 170 would be a liquid with lower density and viscosity. Thus, one preferred fluid for the chamber 172 would include an inert, low viscosity liquid.

In an application that involves gas such as Nitrogen, the density and temperature of the gas will increase as the chamber pressure increases. This follows from the Ideal gas law:

$$P = \rho \frac{R}{M} T,$$

where P is the pressure of the gas; $\rho$ is the density of the gas; M is the molar mass; R is the ideal or universal gas constant; and T is the temperature of the gas. Therefore, should a gas be used in the chamber 172, then operating parameters, equations, excitation signals, and the like may need to account for the gas's increase in density and temperature and the change in the tube's resonant frequency resulting therefrom.

In any event, some of the effects of increased stiffness from high pressure fluid flow in the flow tubes 160 may be offset to some extent by the decreased pressure differential experienced across the flow tubes 160 due to the increased pressure in the surrounding vessel 170.

In addition to using calibration, fluid selection, compensation factors, adjusted equations, and the like to account for operational changes in the disclosed meter 150, physical details of the Coriolis flow meter 150 can be modified to account for how the pressurized fluid inside high pressure chamber 172 and the pressure inside the flow tubes 160 may affect resonant frequencies of the meter 150 and its operational response. For example, the geometry of the meter 150 (i.e., wall thickness of the flow tubes 160, length of the flow tubes 160, material of the flow tubes 160, shape of the flow tubes 160, locations of sensors 157, vibrational excitation signals, etc.) can be modified to compensate for the operational differences due to the increased pressure, density, and viscosity in the chamber 172 surrounding the flow tubes 160.

As an example modification, the geometric shape of the flow tubes 160 can reduce the drag coefficient, thereby reducing the drag friction. In this sense, a cross-sectional area of the flow tube 160 can be shaped like a hydrofoil, which can reduce the drag friction significantly, even if the cross-sectional area of the tube's profile relative to the direction of motion remains the same as a regular cylinder.

In another modification, a series of concave dimples can be formed on the outside surface of the flow tubes 160 to reduce the drag coefficient. External flow across a cylinder with a smooth outer surface tends to become turbulent as the fluid reaches the outermost profile edge of the cylinder (relative to the flow direction). In turn, the area of turbulence adjacent to the cylinder causes a higher pressure differential between the front and back side of the cylinder, increasing the drag force acting on the cylinder. The addition of dimples on the surface of the flow tubes 160 can thereby act to redirect the flow streamlines around the outside of the flow tubes 160, drawing the streamlines further across the back side of the cylindrically shaped tubes 160, reducing the area of the turbulence, and lowering the pressure drop between the front and back of the tubes 160.

Additional shapes may be attached to the external surfaces of the tube 160 in order to reduce drag. These shapes may not be directly in contact with the fluid contained by the tube 160, nor would they contain pressure. Such shapes may also be made from material of lower density than the tube 160 material to reduce the overall tube mass in order to improve the response of the tube 160. For example, the tube's cross-section can have the same round shape, but additional foil shapes could be added externally to the tube to reduce drag.

As noted above with reference to FIG. 3, the Coriolis flow meter 150 can be used in managed pressure drilling (MPD) for a closed-loop drilling system 10. The system 10 operates in a closed-loop circulating system where the rotating control device (RCD) 12 diverts annular flow through the manifold 100 away from the rig floor. The system 10 can identify influxes or outfluxes within the closed-loop environment based on mass and volumetric balances. The system 10 uses the RCD 12 to create the closed loop environment for return flow and uses the choke manifold 100 that contains controllable drilling chokes 110, the Coriolis mass flow meter 150, and an electronic and hydraulic control elements, among a number of other components, to monitor and control the flow.

The Coriolis flow meter 150 as disclosed herein can be rated at higher pressures that can match the pressure rating of the manifold 100 without necessarily having to increase the wall thickness of the flow tube(s) 160. In other words, the pressure rating of the meter 150 can be increased without affecting the functional accuracy of the Coriolis flow meter 150. This allows the entire manifold 100 to be rated for a suitable pressure (e.g., 10,000 psi). The Coriolis flow meter 150 can now be placed up stream of the chokes 110 so that the meter 150 can provide a more accurate flow profile. In the end, the system 10 is no longer pressure limited by the limitations of the Coriolis flow meter 150. The system 10 may also prevent gas from coming out of solution (bubbles forming), which would reduce performance or prevent the meter 150 from functioning.

Figure 6:
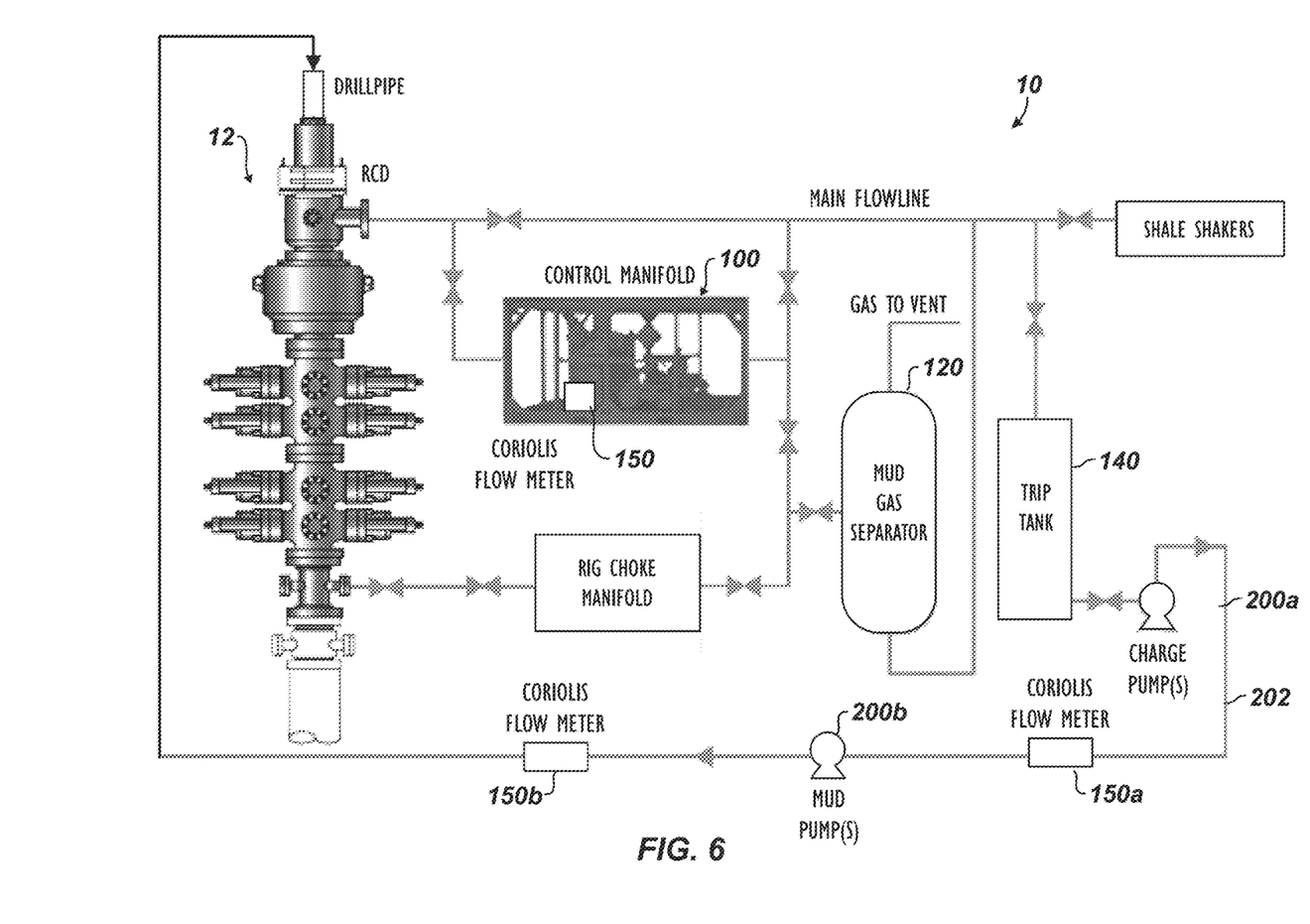
FIG. 6 diagrammatically illustrates a managed pressure drilling system having one or more Coriolis flow meters according to the present disclosure for an inflow leg of the system.

In addition to the above placement of the Coriolis flow meter 150, the disclosed Coriolis flow meter 150 can be positioned elsewhere in a managed pressure drilling system. FIG. 6 diagrammatically illustrates another view of a managed pressure drilling system 10 having more than one Coriolis flow meter 150 according to the present disclosure disposed in the system 10. As before, a Coriolis flow meter 150 can be disposed upstream of the chokes in the manifold 100 according to the teachings provided above.

In additional, one or more Coriolis flow meters 150 can be disposed on the inflow leg 202 of the system 10. In this position, the disclosed flow meter(s) 150 can more accurately measure the mass flow rate and density of the inflow of fluid.

In one arrangement, a Coriolis flow meter 150a can be disposed downstream of a charge pump 200a from the trip tank 140 and uphole of the mud pumps 200b. Fluid pressure from the mud tanks 140 is negligible, and the charge pumps 200a charge the fluid to about 50 to 100-psi before the fluid reaches the mud pumps 200b. In that sense, the Coriolis flow meter 150a after the charge pumps 200a may or may not need to be particularly rated for high-pressure as disclosed herein. Either way, this meter 150a can be used to measure fluid density as well as other useful characteristics of the drilling fluid from the mud tanks 140.

In an alternative or additional arrangement, a Coriolis flow meter 150b can be disposed downstream of the mud pumps 200b feeding into the well. The pressure of the fluid after the mud pumps 200b can be between 1000 to 7000-psi. In this case, the Coriolis flow meter 150b is preferably a high-pressure Coriolis flow meter according to the present disclosure. This flow meter 150b can be used to measure the mass flow of the drilling fluid, which can be used in the well control system.

Measurement of the mass flow rate at the inlet leg 202 after the mud pumps 200b is conventionally achieved using stroke counters and other convoluted techniques that estimate the flow produced from the pumps 200b. As is known, multiple pumps 200b are typically used and the flow from each is combined. According to prior art techniques, pump strokes are counted for each pump 200b to determine their flow, and the resulting flow estimates are combined to determine the combined flow. Additionally, various considerations of pump efficiency and the like are typically taken into account to more accurately estimate the resulting flow. The prior art techniques for estimating the flow from the pumps 200b can be inaccurate and fraught with errors.

The disclosed Coriolis flow meter 150 disposed on the inflow leg 202, however, can avoid all of these issues to measure the mass flow rate at the increased pressure of the combined flow from the mud pumps 200b, which can provide a more accurate flow profile than pump stroke counters. Additionally, the disclosed Coriolis flow meter 150 can determine the density of the fluid in the system 10, which can have its own benefits in controlling the system.

Although discussed in reference to monitoring flow in a managed pressure drilling arrangement, the Coriolis flow meter 150 of the present disclosure can also be used for other drilling applications besides MPD. Moreover, although disclosed in terms of drilling, it will be appreciated that the teachings of the present disclosure and the disclosed Coriolis flow meter 150 can be used in any type of process flow where the mass flow rate is to be measured at high pressures.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus used in a drilling system conducting flow of drilling fluid, the drilling fluid having gas, liquid, and/or solids and being at a first pressure level for drilling a wellbore, the apparatus comprising:
   a Coriolis flow meter for measuring the flow of the drilling fluid and having an inlet side and an outlet side, the meter comprising at least one flow tube adapted to vibrate and conducting the flow of the drilling fluid at the first pressure level from the inlet side to the outlet side, the at least one flow tube configured to withstand a pressure limit, of internal pressure relative to atmospheric pressure, that is less than the first pressure level of the drilling fluid to which the at least one flow tube is exposed;
   a vessel enclosing the at least one flow tube in a chamber and holding an internal fluid separate from the drilling fluid at a second pressure level in the chamber about the at least one flow tube; and
   a controller monitoring variation in the first pressure level of the drilling fluid conducted through the at least one flow tube, the controller regulating the second pressure level of the internal fluid relative to the first pressure level and controlling a pressure differential across the at least one flow tube to conduct the drilling fluid at the first pressure level above the pressure limit of the at least one flow tube.

2. The apparatus of claim 1, wherein the second pressure level is elevated above environmental relative to the first pressure level and reduces the pressure differential across the at least one flow tube.

3. The apparatus of claim 2, wherein the second pressure level is elevated to above the first pressure level and produces a positive of the pressure differential from the chamber to the at least one flow tube.

4. The apparatus of claim 2, wherein the second pressure level is elevated to below the first pressure level and produces a negative of the pressure differential from the chamber to the at least one flow tube.

5. The apparatus of claim 1, wherein the meter comprises:
   at least one exciter disposed adjacent the at least one flow tube and imparting the vibration thereto; and at least first and second sensors disposed respectively adjacent the inlet and outlet sides and measuring response to the imparted vibration.

6. The apparatus of claim 1, wherein the controller comprises a source of the second pressure level in communication with the vessel.

7. The apparatus of claim 6, wherein the source comprises an accumulator translating a pressure associated with the first pressure level to the second pressure level of the internal fluid of the vessel.

8. The apparatus of claim 6, wherein the source comprises a pump producing the second pressure level of the internal fluid of the vessel.

9. The apparatus of claim 1, wherein the controller comprises a pressure sensor associated with the vessel and measuring the second pressure level for comparison to the first pressure level.

10. The apparatus of claim 1, further comprising a choke of the drilling system for the wellbore, the choke in fluid communication downstream of the meter.

11. The apparatus of claim 1, further comprising at least one pump of the drilling system for the wellbore, the meter in fluid communication between the at least one pump and the wellbore.

12. The apparatus of claim 1, further comprising at least one charge pump for a mud tank of the drilling system, the meter in fluid communication downstream from the at least one charge pump.

13. The apparatus of claim 1, further comprising at least one mud pump of the drilling system for the wellbore, the meter in fluid communication downstream from the at least one mud pump connected to the wellbore.

14. The apparatus of claim 1, wherein the at least one flow tube comprises first and second flow tubes disposed in parallel to one another.

15. The apparatus of claim 1, wherein the at least one flow tube defines a bend.

16. The apparatus of claim 1, wherein the vessel holds the internal fluid selected from a group consisting of a liquid, a gas, helium, argon, air, nitrogen, an electrically inert fluid, process fluid, hydraulic fluid, transformer oil, silicon oil, mineral oil, fluorocarbon-based fluid, and castor oil.

17. The apparatus of claim 1, wherein the controller controls excitation of the vibration of the at least one flow tube to account for at least one operational parameter related to the vibration of the at least one flow tube in the internal fluid at the second pressure level.

18. The apparatus of claim 17, wherein to account for the at least one operational parameter, the controller accounts for at least one of:
a density change of the internal fluid in the chamber;
a viscosity change of the internal fluid in the chamber;
drag force on the at least one flow tube as the at least one flow tube vibrates in the internal fluid;
attenuation of the vibration of the at least one flow tube due to the internal fluid in the chamber; and
alteration of a resonant frequency of the at least one flow tube due to the internal fluid in the chamber.

19. The apparatus of claim 18, wherein the at least one flow tube comprises at least one of a wall thickness, a length, a material, a geometric shape, a foil, a series of concave dimples, and a location of vibration sensor configured to compensate for an operational difference in the vibration of the at least one flow tube caused by the internal fluid at the second pressure level in the chamber surrounding the at least one flow tube.

20. A controlled pressure drilling system for a wellbore, the drilling system conducting flow of drilling fluid, the drilling fluid having gas, liquid, and/or solids and being at a first pressure level for drilling the wellbore, the system comprising:
at least one choke in fluid communication with the wellbore and controlling the flow of the drilling fluid from the wellbore; and
a Coriolis flow meter disposed in fluid communication upstream of the at least one choke and measuring the flow of the drilling fluid from the wellbore, the Coriolis flow meter comprising:
at least one flow tube being adapted to vibrate and conducting the flow of the drilling fluid at the first pressure level from an inlet side to an outlet side, the at least one flow tube configured to withstand a pressure limit, of internal pressure relative to atmospheric pressure, that is less than the first pressure level of the drilling fluid to which the at least one flow tube is exposed;
a vessel enclosing the at least one flow tube in a chamber and holding an internal fluid separate from the drilling fluid at a second pressure level in the chamber about the at least one flow tube; and
a controller monitoring variation in the first pressure level of the drilling fluid conducted through the at least one flow tube, the controller regulating the second pressure level of the internal fluid relative to the first pressure level and controlling a pressure differential across the at least one flow tube to conduct the drilling fluid at the first pressure level above the pressure limit of the at least one flow tube.

21. The system of claim 20, wherein the controller is operatively coupled to the at least one choke, the controller monitoring one or more parameters of the flow and controlling operation of the at least one choke in response to the one or more monitored parameters.

22. The system of claim 20, wherein the controller is operatively coupled to the meter, the controller determining a mass flow of the drilling fluid based at least in part on a measurement from the meter.

23. The system of claim 20, wherein the controller is operatively coupled to the meter, the controller determining a density of the drilling fluid based at least in part on a measurement from the meter.

24. The system of claim 20, wherein the at least one choke is in fluid communication with a rotating control device of the wellbore, the meter being disposed in fluid communication between the at least one choke and the rotating control device.

25. The system of claim 20, further comprising another Coriolis flow meter disposed in fluid communication downstream of the at least one choke and configured to operate in conjunction with the Coriolis flow meter disposed in fluid communication upstream of the at least one choke.

26. A drilling system for a wellbore, the drilling system conducting flow of drilling fluid, the drilling fluid having gas, liquid, and/or solids and being at a first pressure level for drilling the wellbore, the system comprising:
at least one pump in fluid communication with the wellbore and delivering the flow of the drilling fluid to the wellbore; and
a Coriolis flow meter disposed in fluid communication between the at least one pump and the wellbore and measuring the flow of the drilling fluid to the wellbore, the Coriolis meter comprising:

at least one flow tube being adapted to vibrate and conducting the flow of the drilling fluid at the first pressure level from an inlet side to an outlet side, the at least one flow tube configured to withstand a pressure limit, of internal pressure relative to atmospheric pressure, that is less than the first pressure level of the drilling fluid to which the at least one flow tube is exposed;

a vessel enclosing the at least one flow tube in a chamber and holding an internal fluid separate from the drilling fluid at a second pressure level in the chamber about the at least one flow tube; and a controller monitoring variation in the first pressure level of the drilling fluid conducted through the at least one flow tube, the controller regulating the second pressure level of the internal fluid relative to the first pressure level and controlling a pressure differential across the at least one flow tube to conduct the drilling fluid at the first pressure level above the pressure limit of the at least one flow tube.

27. A drilling method for a wellbore, the method comprising:

conducting flow of drilling fluid in a drilling system, the drilling fluid having gas, liquid, and/or solids and being at a first pressure level for drilling the wellbore;

measuring the flow by vibrating at least one flow tube of a Coriolis flow meter conducting the flow from an inlet side to an outlet side, the at least one flow tube configured to withstand a pressure limit, of internal pressure relative to atmospheric pressure, being less than the first pressure level of the drilling fluid to which the at least one flow tube is exposed; and controlling, with a controller, a pressure differential across the at least one flow tube to conduct the drilling fluid at the first pressure level above the pressure limit of the at least one flow tube by monitoring variation in the first pressure level of the drilling fluid conducted through the at least one flow tube and regulating, relative to the first pressure level, a second pressure level of an internal fluid separate from the drilling fluid in a chamber of a vessel disposed about the at least one flow tube.

28. The method of claim 27, further comprising accounting for at least one operational parameter related to the vibration of the at least one flow tube in the internal fluid at the second pressure level by controlling, with the controller, excitation of the vibration of the at least one flow tube.

29. The method of claim 28, wherein accounting for the at least one operational parameter comprises accounting for at least one of:

a density change of the internal fluid in the chamber;
a viscosity change of the internal fluid in the chamber;
drag force on the at least one flow tube as the at least one flow tube vibrates in the internal fluid;
attenuation of the vibration of the at least one flow tube due to the internal fluid in the chamber; and
alteration of a resonant frequency of the at least one flow tube due to the internal fluid in the chamber.

30. The method of claim 27, further comprising compensating for an operational difference in the vibration of the at least one flow tube caused by the internal fluid at the second pressure level in the chamber surrounding the at least one flow tube by configuring the at least one flow tube with respect to at least one of a wall thickness, a length, a material, a geometric shape, a foil, a series of concave dimples, and a location of vibration sensor.

31. The method of claim 27, wherein conducting the flow of the drilling fluid comprises controlling surface backpressure in the wellbore by controlling the flow of the drilling fluid from the wellbore with at least one choke; and wherein measuring the flow comprises measuring the flow from the wellbore upstream of the at least one choke by operating the Coriolis flow meter.

32. The method of claim 27, wherein conducting the flow of the drilling fluid comprises delivering the flow of the drilling fluid from at least one pump to the wellbore; and wherein measuring the flow comprises measuring the flow of the drilling fluid from the at least one pump to the wellbore by operating the Coriolis flow meter.

* * * * *